US009651820B2

(12) United States Patent
Li et al.

(10) Patent No.: US 9,651,820 B2
(45) Date of Patent: May 16, 2017

(54) LIQUID CRYSTAL DISPLAY APPARATUS COMPRISING A POLAROID AND A POLARIZATION ANALYZER HAVING A TRANSPARENT PLATE WITH A QUADRANGLE STRUCTURE

(71) Applicant: Boe Technology Group Co., Ltd., Beijing (CN)

(72) Inventors: Pan Li, Beijing (CN); Yanbing Wu, Beijing (CN); Wenbo Li, Beijing (CN); Chunyan Ji, Beijing (CN); Xiangyan Zhang, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 0 days.

(21) Appl. No.: 14/500,235

(22) Filed: Sep. 29, 2014

(65) Prior Publication Data
US 2015/0370126 A1 Dec. 24, 2015

(30) Foreign Application Priority Data
Jun. 20, 2014 (CN) .......................... 2014 1 0280184

(51) Int. Cl.
*G02F 1/1335* (2006.01)
(52) U.S. Cl.
CPC .................. *G02F 1/133528* (2013.01); *G02F 2001/13355* (2013.01)
(58) Field of Classification Search
CPC ........... G02F 1/133528; G02F 1/13362; G02F 1/133602
(Continued)

(56) References Cited

U.S. PATENT DOCUMENTS

2006/0250567 A1* 11/2006 Yu .......................... G02B 5/3008
349/181
2009/0268109 A1* 10/2009 Schluchter ........... G02B 17/023
349/9
(Continued)

FOREIGN PATENT DOCUMENTS

| CN | 1971374 | 5/2007 |
| CN | 202159156 | 3/2012 |
| JP | H07333607 | 12/1995 |

OTHER PUBLICATIONS

Office action from Chinese Application No. 201410280184.1 dated Mar. 31, 2016.
(Continued)

*Primary Examiner* — Paul Lee
(74) *Attorney, Agent, or Firm* — Calfee, Halter & Griswold LLP

(57) ABSTRACT

A liquid crystal display device includes a liquid crystal panel, a polaroid for polarizing light positioned on a light incident side of the liquid crystal panel, and a polarization analyzer positioned on a light emission side of the liquid crystal panel. The polarization analyzer includes a transparent plate. The transparent plate being arranged at a set angle with a light emission surface of the liquid crystal panel, such that the transparent plate analyzes polarization of light emitted from the light emission surface of the liquid crystal panel. Because the polaroid is used only on the light incident side of the liquid crystal panel, while the transparent plate is used instead of a polaroid on the light emission side of the liquid crystal panel, a reduction in the material cost of the liquid crystal display device can be achieved.

10 Claims, 2 Drawing Sheets

(58) Field of Classification Search
USPC .................................................. 349/97–103
See application file for complete search history.

(56) References Cited

U.S. PATENT DOCUMENTS

2010/0026945 A1* 2/2010 Tan ................... G02F 1/133632
　　　　　　　　　　　　　　　　　　　349/119
2010/0123854 A1* 5/2010 Adachi ..................... F21V 7/04
　　　　　　　　　　　　　　　　　　　349/61

OTHER PUBLICATIONS

Office action from Chinese Application No. 201410280184.1 dated Oct. 31, 2016.

* cited by examiner

LIQUID CRYSTAL DISPLAY APPARATUS COMPRISING A POLAROID AND A POLARIZATION ANALYZER HAVING A TRANSPARENT PLATE WITH A QUADRANGLE STRUCTURE

RELATED APPLICATIONS

The present application claims the benefit of Chinese Patent Application No. 201410280184.1, filed Jun. 20, 2014, the entire disclosure of which is incorporated herein by reference.

FIELD

This disclosure relates to the field of display technology, and particularly to a liquid crystal display apparatus.

BACKGROUND

In a liquid crystal display apparatus, a liquid crystal panel needs to be provided with a polaroid on a light incident side thereof and with a polarization analyzer on a light emission side thereof. For the liquid crystal display apparatus to realize display, the polaroid, the liquid crystal layer of the liquid crystal panel, and the polarization analyzer need to cooperate with each other to perform control of the lightness of respective pixel units in the liquid crystal display apparatus, and thereby to realize display of a pattern.

In a conventional liquid crystal display apparatus, both the polaroid on the light incident side of the liquid crystal panel and the polarization analyzer on the light emission side of the liquid crystal panel comprise a polaroid.

At present, materials can account for approximately 70% of the cost of a liquid crystal display apparatus, among which various film materials are dominant. Particularly, the cost of the two polaroids used in the conventional liquid crystal display apparatus is up to 13% of the total material cost.

As a result, it would be desirable to reduce the number of polaroids employed in the liquid crystal display apparatus so as to reduce material cost of the liquid crystal display apparatus, and a technical solution to such a problem remains unmet.

SUMMARY

This disclosure provides a liquid crystal display apparatus in which only one polaroid is employed, thus enabling a reduction of the material cost of the liquid crystal display apparatus.

In an exemplary embodiment of the present disclosure, a liquid crystal display apparatus comprises a liquid crystal panel, a polaroid for polarizing light positioned on a light incident side of the liquid crystal panel, and a polarization analyzer positioned on a light emission side of the liquid crystal panel; wherein the polarization analyzer includes a transparent plate; wherein the transparent plate is arranged at a set angle with a light emission surface of the liquid crystal panel; and wherein the transparent plate analyzes polarization of light emitted from the light emission surface of the liquid crystal panel.

In an exemplary embodiment of the liquid crystal display apparatus, the polarization analyzer arranged on the light emission side of the liquid crystal panel is a transparent plate; a first side and a second side opposing one another in the transparent plate are parallel with the light emission surface of the liquid crystal panel; there is a set angle between the transparent plate and the light emission surface of the liquid crystal panel; and a distance between the transparent plate and the light emission surface of the liquid crystal panel increases along a direction from the first side towards the second side. In the exemplary liquid crystal display apparatus, since there is a set angle between the transparent plate and the light emission surface of the liquid crystal panel, as long as an incident angle of light emitted from the light emission surface of the liquid crystal panel upon incidence on the transparent plate satisfies a Brewster angle in the Brewster law, the transparent plate can play a role of analyzing polarization of light emitted from the light emission surface of the liquid crystal panel.

Hence, in the exemplary liquid crystal display apparatus, the polaroid is provided only on the light incident side of the liquid crystal panel, while the transparent plate is used instead of a polaroid on the light emission side of the liquid crystal panel. As materials for the transparent plate are relatively common and generally less expensive, the material cost of the liquid crystal display apparatus can be reduced.

According to an exemplary embodiment, a light incident surface of the transparent plate has a structure of a quadrangle. A first side and a second side opposing one another in the light incident surface of the transparent plate are each parallel with the light emission surface of the liquid crystal panel. A distance between the transparent plate and the light emission surface of the liquid crystal panel increases along a direction from the first side towards the second side.

According to an exemplary embodiment, the first side of the transparent plate is parallel with a light absorption axis of the polaroid.

According to another exemplary embodiment, the first side of the transparent plate is parallel with and seal-fits an upper side of the liquid crystal panel while displaying a pattern.

According to a further exemplary embodiment, the liquid crystal display apparatus further includes a fixed mount, and both the liquid crystal panel and the transparent plate are installed on the fixed mount.

According to yet another exemplary embodiment, the transparent plate further has a third side and a fourth side, which are parallel with one another, and the third side and the fourth side are perpendicular to the first side. In an exemplary embodiment, the fixed mount comprises: two side light barriers parallel with one another, the side light barriers being perpendicular to the first side of the transparent plate, wherein one of the side light barriers is connected to the third side of the transparent plate, and the other of the side light barriers is connected to the fourth side of the transparent plate; and a bottom plate, the bottom plate being arranged between the two side light barriers, and the bottom plate being parallel with the second side and perpendicular to the liquid crystal panel. The second side of the transparent plate is installed on the bottom plate.

According to an exemplary embodiment, an incident angle of light emitted from the light emission surface of the liquid crystal panel upon incidence on the transparent plate is equal to a Brewster angle of the transparent plate.

According to another exemplary embodiment, the transparent plate is a glass plate or a plastic plate.

According to a further exemplary embodiment, the liquid crystal display apparatus further includes a backlight module, the backlight module being located on a side of the polaroid facing away from the liquid crystal panel.

According to yet another exemplary embodiment, the set angle is larger than or equal to 30 degrees.

According to an exemplary embodiment, the liquid crystal panel is an IPS mode liquid crystal panel, a TN mode liquid crystal panel, or a VA mode liquid crystal panel.

DETAILED DESCRIPTION

The present invention and associated general inventive concepts will be further described hereinafter in detail with reference to the accompanying drawings and various exemplary embodiments. One of ordinary skill in the art will appreciate that these exemplary embodiments only constitute a fraction of the possible embodiments encompassed by the present invention and associated general inventive concepts. As such, the scope of the present disclosure is by no means limited to the exemplary embodiments set forth herein.

Figure 1:
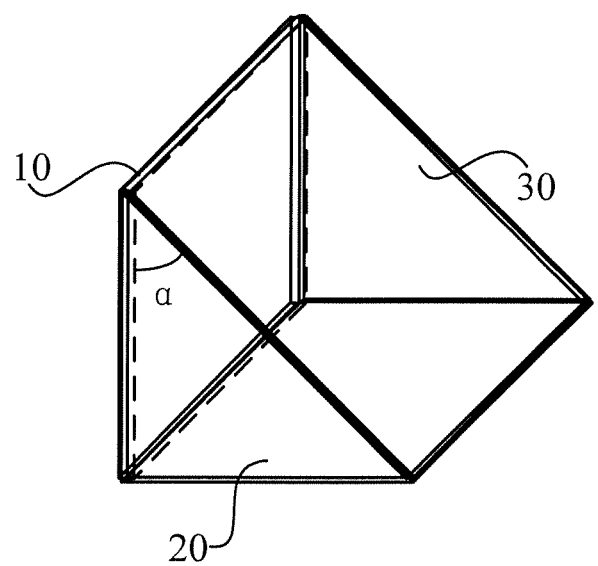
FIG. 1 is a schematic diagram of a structure of connections among a liquid crystal panel, a fixed mount, and a transparent plate in a liquid crystal display apparatus, according an exemplary embodiment.
Figure 2:
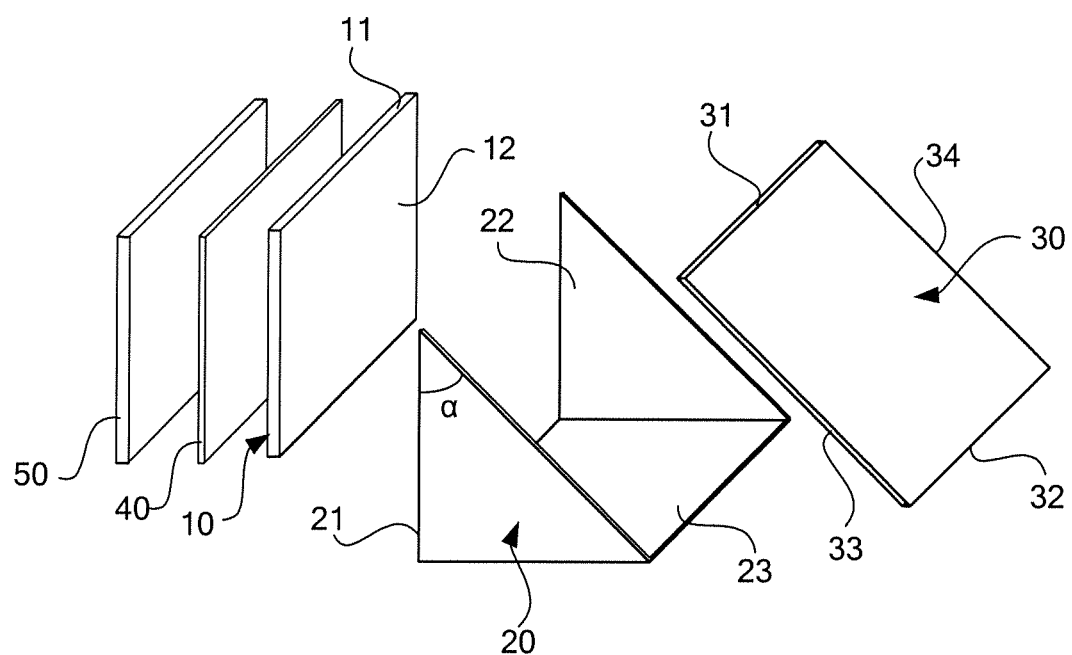
FIG. 2 is a schematic diagram of an exploded structure of a liquid crystal display apparatus, according to an exemplary embodiment.

Referring to FIG. 1, an assembly including a liquid crystal panel, a fixed mount, and a transparent plate in a liquid crystal display apparatus, according to an exemplary embodiment, are shown. FIG. 2 shows an exploded structure of a liquid crystal display apparatus, according to an exemplary embodiment.

As depicted in FIGS. 1 and 2, a liquid crystal display apparatus includes a liquid crystal panel 10, a polaroid 40 for polarizing light positioned on a light incident side of the liquid crystal panel 10, and a polarization analyzer positioned on a light emission side of the liquid crystal panel 10. The polarization analyzer includes a transparent plate 30, wherein the transparent plate 30 is arranged at a set angle with a light emission surface of the liquid crystal panel 10, such that the transparent plate 30 analyzes polarization of light emitted from the light emission surface of the liquid crystal panel 10.

The transparent plate 30 may be made of any suitable transparent material. In an exemplary embodiment, the transparent plate 30 is a glass plate or a plastic plate.

In the exemplary liquid crystal display apparatus, the polarization analyzer arranged on the light emission side of the liquid crystal panel 10 is the transparent plate 30, and there is a set angle α between the transparent plate 30 and the light emission surface 12 of the liquid crystal panel 10. Since there is a set angle α between the transparent plate 30 and the light emission surface 12 of the liquid crystal panel 10, as long as an incident angle of light emitted from the light emission surface 12 of the liquid crystal panel 10 upon incidence on the transparent plate 30 satisfies a Brewster angle in the Brewster law, the transparent plate 30 can play a role of analyzing polarization of the light emitted from the light emission surface 12 of the liquid crystal panel 10.

Hence, in the exemplary liquid crystal display apparatus, the polaroid 40 is provided only on the light incident side of the liquid crystal panel 10, while the transparent plate 30 is used instead of a polaroid on the light emission side of the liquid crystal panel 10. As materials for the transparent plate 30 (e.g., glass, plastic) are relatively common and generally less expensive, the material cost of the liquid crystal display apparatus can be reduced.

Furthermore, the transparent plate 30 adopted to serve as a polarization analyzer on the light emission side of the liquid crystal panel 10 can decrease the loss of light when it passes through the polarization analyzer, thereby enhancing utilization of the light emitted by a backlight module when the liquid crystal display apparatus displays.

As shown in FIG. 2, a light incident surface of the transparent plate 30 has a structure of a quadrangle, and a first side 31 and a second side 32 opposing one another in the light incident surface of the transparent plate 30 are each parallel with the light emission surface 12 of the liquid crystal panel 10. A distance between the transparent plate 30 and the light emission surface 12 of the liquid crystal panel 10 increases along a direction from the first side 31 towards the second side 32. As shown in FIG. 1, there is a set angle α between the transparent plate 30 and the light emission surface 12 of the liquid crystal panel 10.

The first side 31 of the transparent plate 30 may be parallel with a light absorption axis of the polaroid 40. In this case, a light absorption axis of the polarization analyzer formed by the transparent plate 30 is perpendicular to the light absorption axis of the polaroid 40.

Alternatively, the first side 31 of the transparent plate 30 may also be perpendicular to a light absorption axis of the polaroid 40. In this case, a light absorption axis of the polarization analyzer formed by the transparent plate 30 is parallel with the light absorption axis of the polaroid 40.

As shown in FIGS. 1 and 2, the first side 31 of the transparent plate 30 is parallel with and seal-fits an upper side 11 of the liquid crystal panel 10 while displaying a pattern. The above-mentioned structure may ensure that a thickness of the liquid crystal display apparatus is decreased while the transparent plate 30 plays a role of analyzing polarization.

As shown in FIGS. 1 and 2, the exemplary liquid crystal display apparatus further includes a fixed mount 20, and both the liquid crystal panel 10 and the transparent plate 30 are installed on the fixed mount 20. With both the liquid crystal panel 10 and the transparent plate 30 installed on the fixed mount 20, stability of the relative positions between the liquid crystal panel 10 and the transparent plate 30 can be improved.

The transparent plate 30 further has a third side 33 and a fourth side 34, which are parallel with one another, and the third side 33 and the fourth side 34 are perpendicular to the first side 31.

In an exemplary embodiment, the fixed mount 20 comprises two side light barriers parallel with one another, such as a side light barrier 21 and a side light barrier 22, and a bottom plate 23. As shown in FIG. 2, the side light barriers 21 and 22 are perpendicular to the first side 31 of the transparent plate 30. The side light barrier 21 is connected to the third side 33 of the transparent plate 30. The side light barrier 22 is connected to the fourth side 34 of the transparent plate 30. The bottom plate 23 is arranged between the side light barrier 21 and the side light barrier 22. The bottom plate 23 is parallel with the second side 32 of the transparent plate 30 and perpendicular to the liquid crystal panel 10. The second side 32 of the transparent plate 30 is installed on the bottom plate 23.

The fixed mount 20 comprises the side light barrier 21, the side light barrier 22, and the bottom plate 23, wherein this combined structure can block the influence of exterior ambient light on the liquid crystal display apparatus while displaying (i.e., during operation).

In an exemplary embodiment, the fixed mount 20 is made of a plastic material.

As shown in FIG. 2, the liquid crystal display apparatus further includes a backlight module 50, the backlight module 50 being located on a side of the polaroid 40 facing away from the liquid crystal panel 10.

When the liquid crystal display apparatus further includes the fixed mount, the backlight module 50 can be installed on the fixed mount 20.

An incident angle of the light emitted from the light emission surface 12 of the liquid crystal panel 10 upon incidence on the transparent plate 30 is equal to a Brewster angle of the transparent plate 30.

In an exemplary embodiment, the set angle between the transparent plate 30 and the light emission surface 12 of the liquid crystal panel 10 is greater than or equal to 30 degrees. The set angle α is greater than or equal to 30 degrees and is smaller than a total reflection critical angle of the transparent plate 30. In general, the larger the set angle α, the better the potential effect of the polarization analysis by the transparent plate 30.

In an exemplary embodiment, the liquid crystal panel is an IPS mode liquid crystal panel, a TN mode liquid crystal panel, or a VA mode liquid crystal panel.

The above embodiments are only exemplary of the present invention and the associated general inventive concepts. It should be noted that one of ordinary skill in the art would appreciate that various modifications and substitutions could be made without departing from the spirit and scope of the present invention.

The invention claimed is:

1. A liquid crystal display apparatus comprises:
   a liquid crystal panel,
   a polaroid positioned on a light incident side of the liquid crystal panel, and
   a polarization analyzer positioned on a light emission side of the liquid crystal panel;
   wherein the polarization analyzer comprises a transparent plate; the transparent plate is arranged at a set angle with a light emission surface of the liquid crystal panel, whereby the transparent plate analyzes polarization of light emitted from the light emission surface of the liquid crystal panel; and
   a light incident surface of the transparent plate has a quadrangle structure; wherein a first side and a second side opposing one another in the light incident surface of the transparent plate are parallel with the light emission surface of the liquid crystal panel; and wherein a distance between the transparent plate and the light emission surface of the liquid crystal panel increases along a direction from the first side towards the second side.

2. The liquid crystal display apparatus of claim 1, wherein the first side of the transparent plate is parallel with a light absorption axis of the polaroid.

3. The liquid crystal display apparatus of claim 1, wherein the first side of the transparent plate is parallel with and seal-fits an upper side of the liquid crystal panel.

4. The liquid crystal display apparatus of claim 3, further comprising a fixed mount, wherein both the liquid crystal panel and the transparent plate are installed on the fixed mount.

5. The liquid crystal display apparatus of claim 4, wherein the transparent plate further has a third side and a fourth side parallel with one another, and the third side as well as the fourth side are perpendicular to the first side; and the fixed mount comprises:
   two side light barriers parallel with one another, the side light barriers being perpendicular to the first side of the transparent plate, wherein one of the side light barriers is connected to the third side of the transparent plate, and the other of the side light barriers is connected to the fourth side of the transparent plate; and
   a bottom plate, the bottom plate being arranged between the side light barriers, and the bottom plate being parallel with the second side and perpendicular to the liquid crystal panel;
   wherein the second side of the transparent plate is installed on the bottom plate.

6. The liquid crystal display apparatus of claim 1, wherein an incident angle of light emitted from the light emission surface of the liquid crystal panel upon incidence on the transparent plate is equal to a Brewster angle of the transparent plate.

7. The liquid crystal display apparatus of claim 1, wherein the transparent plate is one of a glass plate and a plastic plate.

8. The liquid crystal display apparatus of claim 7, wherein the set angle is greater than or equal to 30 degrees.

9. The liquid crystal display apparatus of claim 1, further comprising:
   a backlight module, the backlight module being located on a side of the polaroid opposite the liquid crystal panel.

10. The liquid crystal display apparatus of claim 1, wherein the liquid crystal panel is one of an IPS mode liquid crystal panel, a TN mode liquid crystal panel, and a VA mode liquid crystal panel.

* * * * *